United States Patent [19]
Heguy et al.

[11] 4,328,975
[45] May 11, 1982

[54] QUICK-CHANGE MECHANISM FOR STANDARD MILLING SPINDLES

[76] Inventors: Jean-Pierre Heguy; Jean-Michel Heguy; Jean-Leon Heguy, all of Quartier Etchartia-Minnotz, 64240 Hasparren, France

[21] Appl. No.: 16,516
[22] Filed: Mar. 1, 1979
[30] Foreign Application Priority Data
 Mar. 2, 1978 [FR] France .............................. 78 06881
[51] Int. Cl.³ ...................... B23B 31/06; B23B 31/44; B23C 5/26
[52] U.S. Cl. .................................. 279/91; 279/1 E; 409/234
[58] Field of Search ...................... 409/231, 232, 234; 279/1 B, 1 A, 91, 1 E

[56] References Cited
U.S. PATENT DOCUMENTS 2,611,621  9/1952  Patterson et al. ..................... 279/91
2,918,291 12/1959  Plantas .............................. 279/1 B X
3,529,843  9/1970  Benjamin et al. ..................... 279/91
3,679,220  7/1972  Reeves ................................ 279/1 B Primary Examiner—Z. R. Bilinsky
Attorney, Agent, or Firm—Erwin S. Teltscher

[57] ABSTRACT

An adaptor for securing a tool to a spindle includes a first member which can be secured to the spindle, and a second member attachable to the first member; the first and second members have through-going bores, respectively, for receiving the tool, and the second member acts as a cam for a cam follower which is received by the second member. A holding device for holding the cam follower is disposed within the second member, and a locking member may be attached to the first member. The cam follower cooperates with the locking member, and may be moved from an unlocked position, wherein the tool is locked to the spindle, to an unlocked position, wherein the tool is released from the spindle.

12 Claims, 17 Drawing Figures

QUICK-CHANGE MECHANISM FOR STANDARD MILLING SPINDLES

BACKGROUND OF THE INVENTION

Most conventional mechanisms fitted on milling machines are awkward to use; the problem is that fixing and removing the tools necessitates the unscrewing of a threaded rod at an upper extremity of the milling machine. This operation, which often requires the use of a stepladder, involves a considerable waste of time, as numerous tools have to be used sequentially.

There exist a number of devices which are an improvement over the conventional system, but none of them are free from drawbacks. In all of them, centering is effected by means of a detachable cone sleeve, which thus extends the nose of the spindle by two to five centimeters. This extension lessens its machining capacity and, consequently, its capacity to work on large-size parts. The lengthening also creates an imbalance with consequent loss of rigidity and occurrance of vibrations, especially in the case of any heavy stress exerted on the machine; moreover there are sometimes difficulties in centering milling spindles on account of the way they are designed. These drawbacks are due to the difficulty of perfectly cleaning and maintaining the spindle cone, or the cone sleeve.

SUMMARY OF THE INVENTION

The object of the present invention is to avoid these drawbacks by dispensing with a stay rod or a cone sleeve. The mechanism described here makes it possible to mount the tool rapidly and also to remove it with an automatic release and ejection device. Exchanging one tool for another takes about fifteen seconds. Another great advantage of the mechanism, according to the present invention, is due to the automatic alignment and setting of its tenons at right angles with respect to the bosses or shoulders of the milling spindle, which ensures full rigidity, once locked. The mechanism described in the present application, although being mounted directly on the spindle of the machine, nevertheless permits existing machines to retain their full precision and capacity.

The objects of the invention are attained by providing an adaptor for securing a tool to a spindle, which includes a first member securable to the spindle, a second member attachable to the first member, the first and second members having through-going bores, respectively, for receiving the tool, the second member acting as a cam, cam follower means receivable by the second member, holding means for holding the cam follower means within the second member, and a locking member attachable to the first member, the cam follower means cooperating with the locking member, and being movable from an unlocked position, wherein the tool is locked to the spindle, to an unlocked position, wherein the tool is released from the spindle.

It is advantageous if the second member has an inner annular flange, and is formed with an inner groove, and if the cam follower means is a ring for supporting the tool, the ring resting on the inner annular flange, and if the holding means is a circlips. The ring is preferably provided with a pair of oppositely located and inwardly projecting guides for mating with corresponding recesses in the tool. p The first and second members are advantageously provided with mating outer and inner threads, respectively, for the second member to be screwed onto the first member.

The first member has preferably first and second apertures disposed diametrically opposite one another across the bore, and also first and second screws fitting into mating first and second threaded openings in the spindle for securing the first member thereto. The first member preferably comprises first and second embossed portions disposed diametrically opposite one another across the through-going bore for reinforcing the first member, and is formed with the first and second apertures, respectively. The first member preferably includes first and second studs for making operative contact with the spindle, is advantageously formed with first and second respective openings therein, and is disposed on a side thereof facing the holding means; the first and second studs are preferably spaced from the first and second embossed portions by about 45°, respectively.

The unlocked position is advantageously spaced apart from the locked position by a predetermined angle, and the first member preferably has an arcuate groove, and a recess formed on a portion of the first member disposed opposite one end of the arcuate groove; the cam follower means advantageously includes a guide pin movable within the arcuate groove, the arcuate groove limiting travel of the guide pin therewithin to the predetermined angle, and the locking member fitting into the recess.

The ring has advantageously an arcuate inner groove disposed approximately midway between the inwardly projecting guides; the arcuate inner groove preferably subtends an angle of approximately 90°, and the predetermined angle is preferably approximately 90°, also.

The second member has advantageously inwardly projecting resilient means, and the cam follower means has preferably on its circumference a plurality of notches, at least one of the notches being engageable by the resilient means. In a preferred version of the invention, the notches are substantially equidistant from one another.

The second member has advantageously at least one radially through-going threaded bore, and the resilient means are preferably disposed in at least one through-going bore, and advantageously include means for engaging at least one of the notches. The engagement means advantageously include a screw mating with the threaded through-going bore; a spring preferably abuts the screw radially, and a ball abuts the spring, the ball being engageable with a corresponding one of the notches. The second member has advantageously a plurality of threaded holes on the periphery thereof for having respective screws pass therethrough to rigidly lock the second member to the tool.

BRIEF DESCRIPTION OF THE DRAWING

The invention will be better understood with the aid of the accompanying drawings, in which.

DESCRIPTION OF THE PREFERRED EMBODIMENTS

Figure 2:
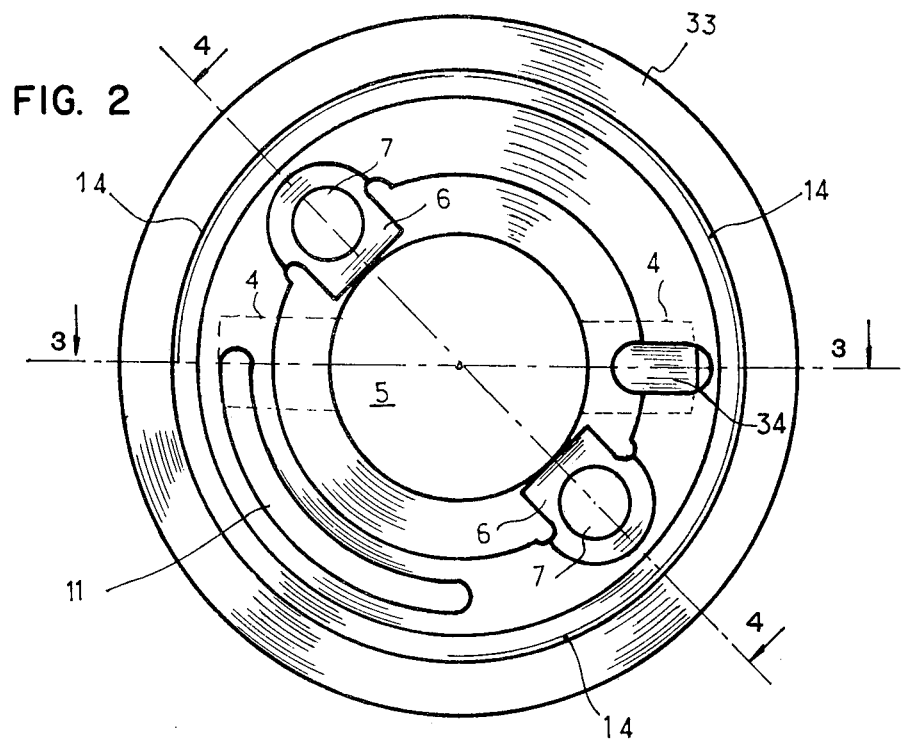
FIG. 2 shows a plan view of the underside of the upper member.
Figure 3:
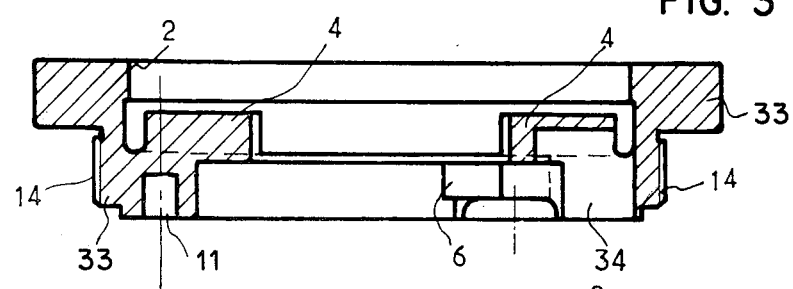
FIG. 3 shows a full sectional view of the upper member taken along the line A—A of FIG. 2 line B—B being displaced by 45° from line A—A.
Figure 4:
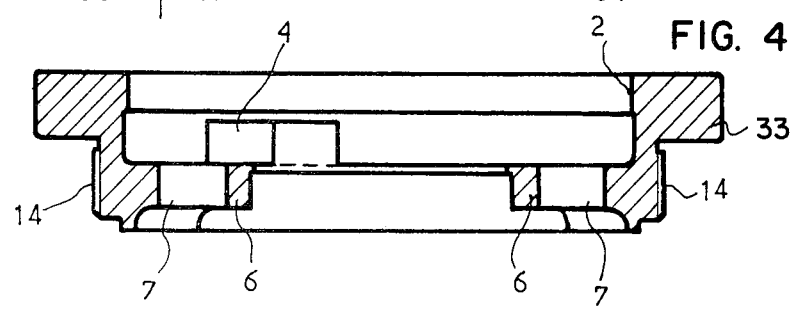
FIG. 4 shows a full sectional view of the upper member taken along line B—B of FIG. 2.

Referring now to the drawing, the upper part of a first, or upper member 33 of the mechanism is formed with a bore 2 used for centering the upper member 33 on a shaft or spindle 3. Two tenons or stubs 4 are integral with a ring portion of the upper member 33, are adapted to operatively abut a face of the spindle 3, and border a central hole 5 of the upper member 33, which hole 5 communicates with the bore 2. A groove 34 is formed between the ring portion and the tenons 4 in the upper member 33, spindle 3. Two male tenons or studs 4 are disposed diametrically opposite one another on either side of a central hole 5 formed in the upper member 33, and project outwardly from grooves 34, so as to drive the spindle 3. On the underside of the upper member 33 of the mechanism, and displaced at an angle of 45° from the tenons or studs 4, two other tenons or embossed portions 6 are disposed diametrically opposite one another on either side of the central hole 5 as shown in FIG. 2.

Figure 11:
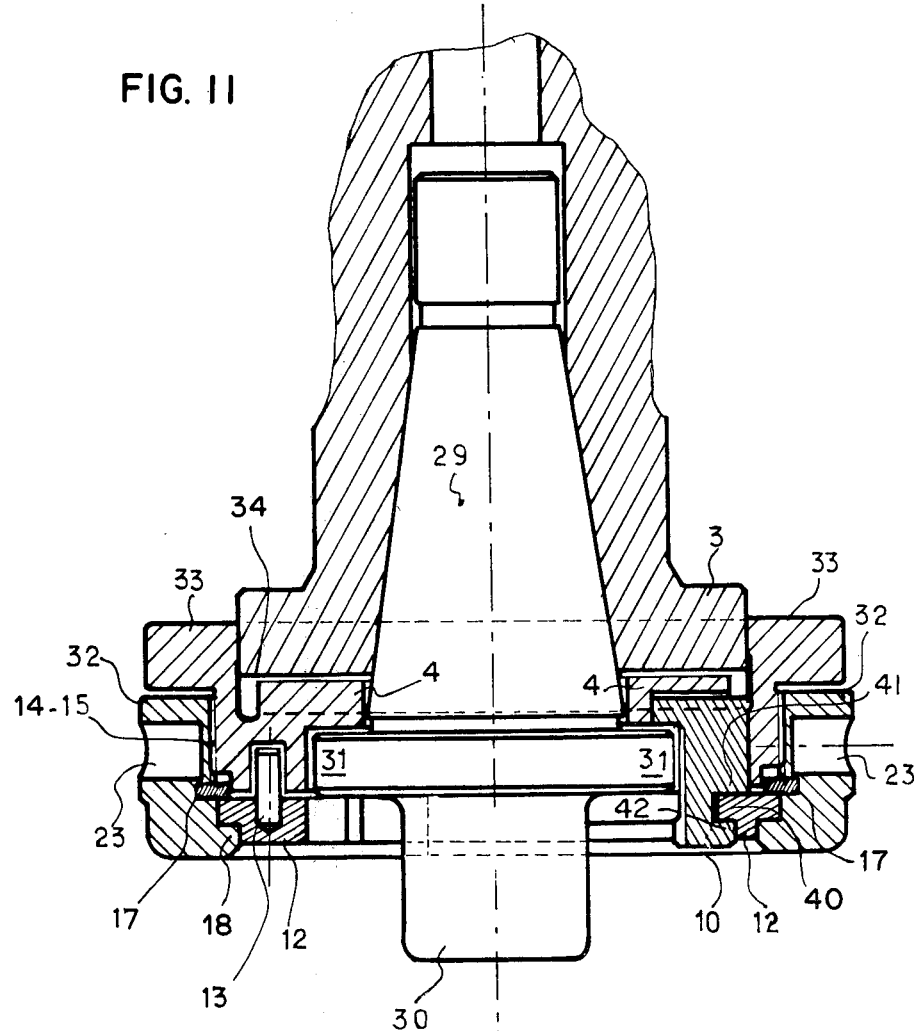
FIG. 11 is a full sectional elevation view showing a spindle with the tool in the locked position.
Figure 12:
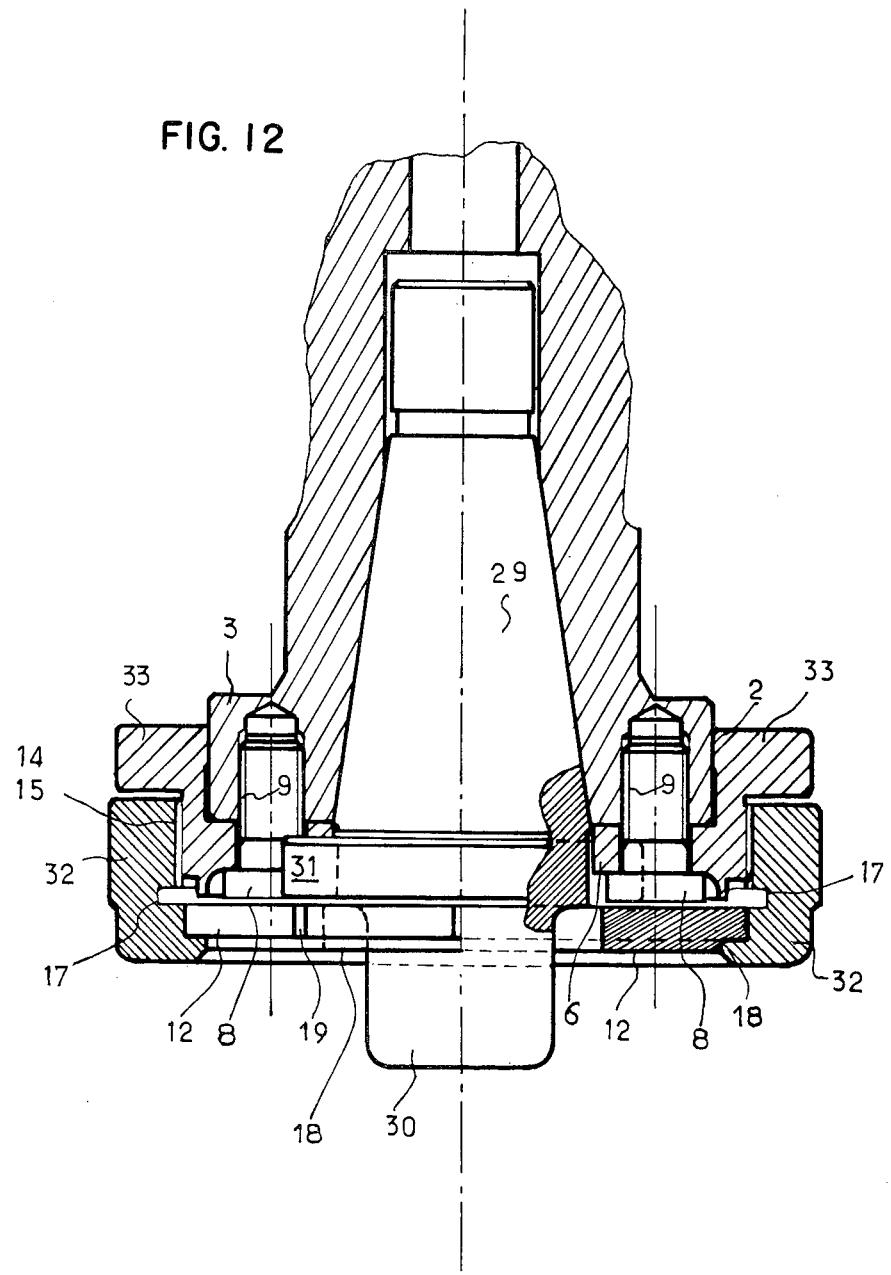
FIG. 12 is a full sectional elevation view showing the tool in position on the milling machine, in the unlocked position.
Figure 13:
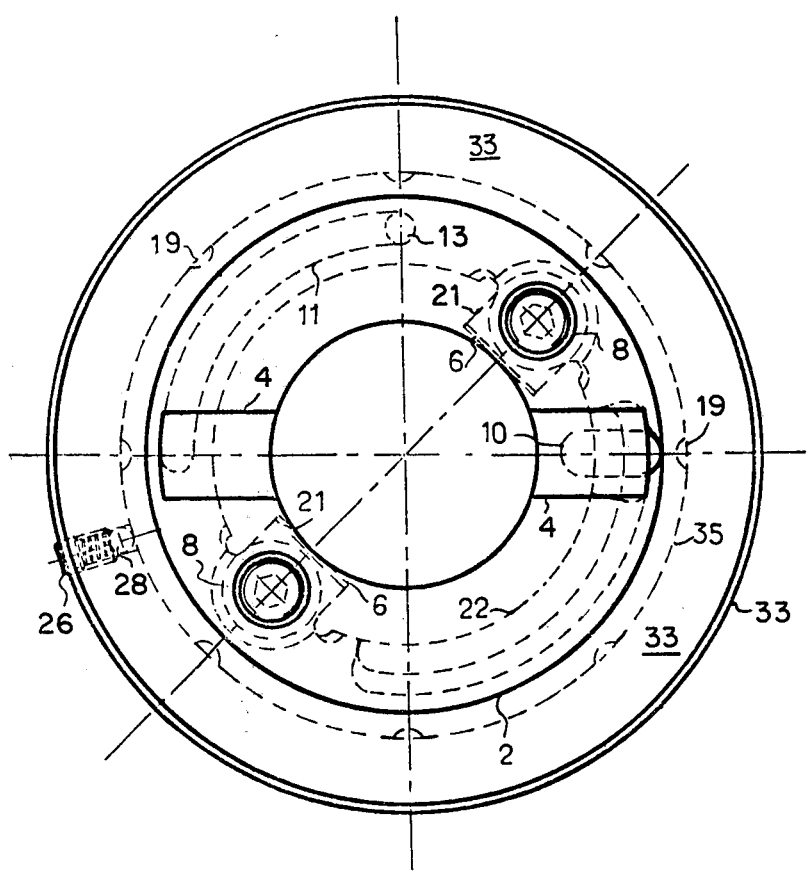
FIG. 13 is a plan view showing the top of the adaptor in its unlocked position, but not emplaced on the shaft of the milling machine.
Figure 14:
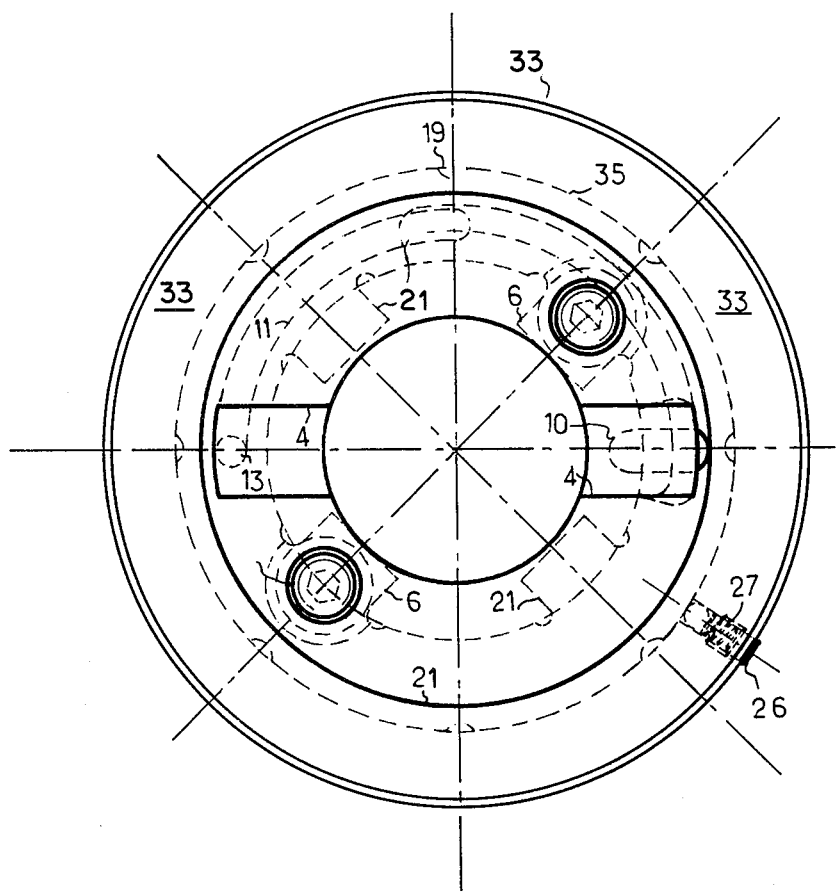
FIG. 14 is a plan view showing the top of the adaptor in its locked position, the bosses 21 being then positioned at right angles with respect to the embossed portions 6.
Figure 15:
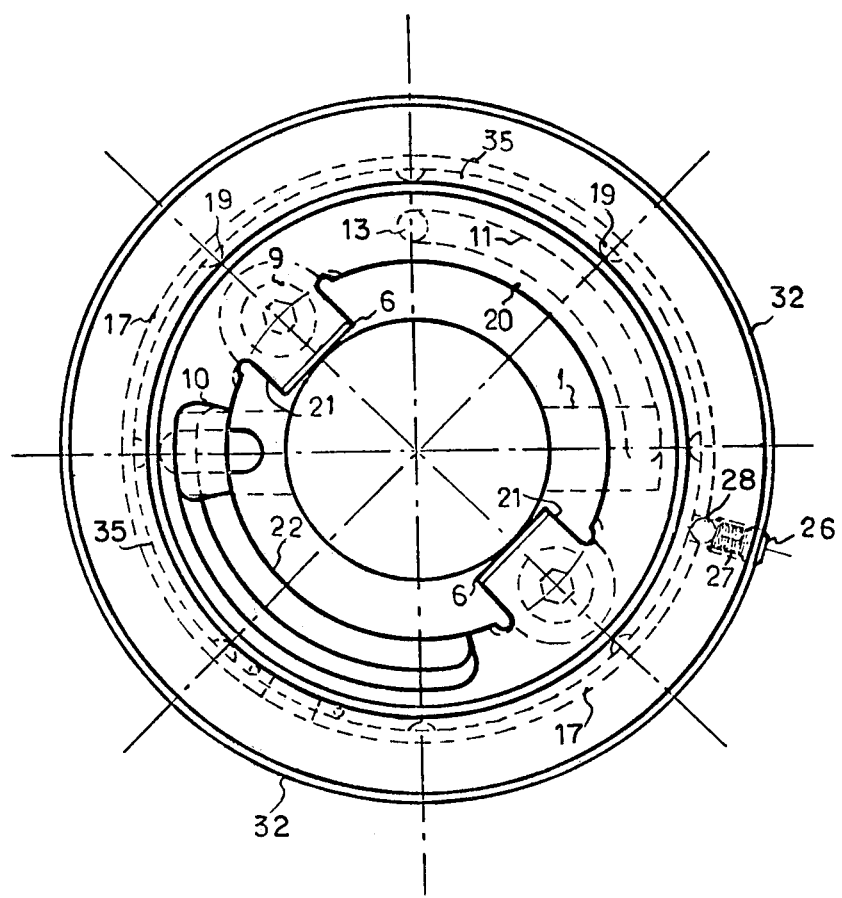
FIG. 15 is a plan view showing the underside of the adaptor, the bosses 21 and the embossed portions 6 being superimposed, the guide pin 13 being then positioned at one end of the groove 11.
Figure 16:
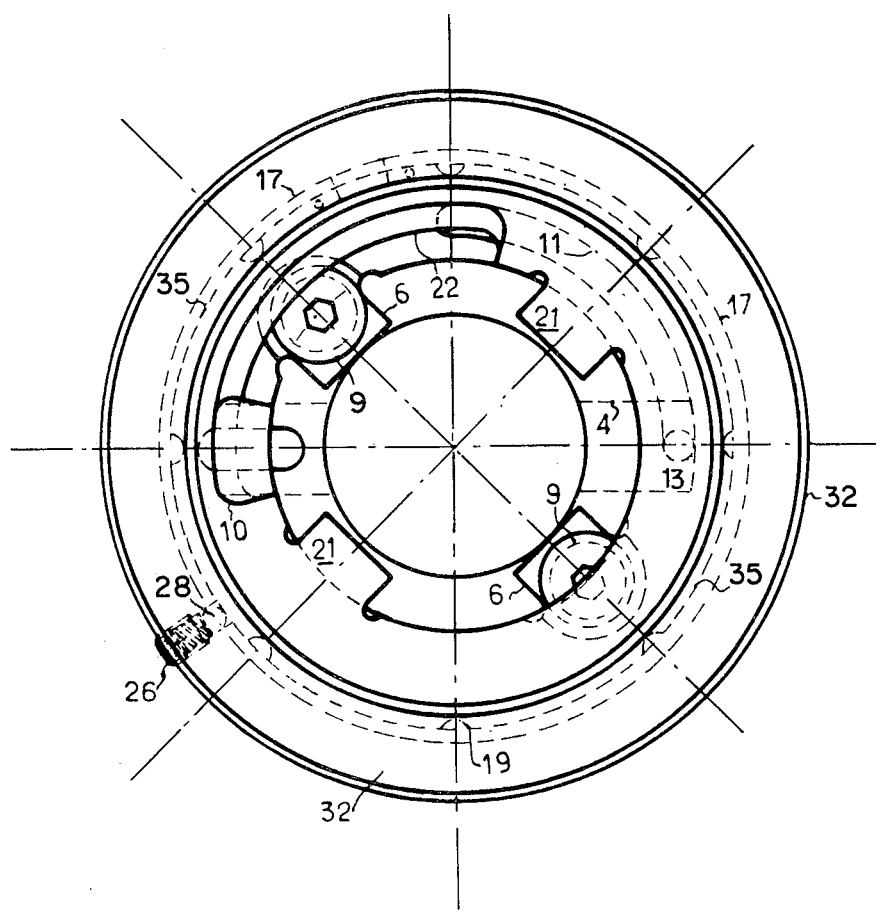
FIG. 16 is a plan view showing the underside of the adaptor in its locked position, the bosses 21 being then positioned at right angles with respect to the embossed portions 6, and the guide pin 13 being positioned at the other end of the groove 11.

The two tenons or embossed portions 6 each have a hole 7 through which a screw 8 formed with a thread 9 can be screwed into one of the four tapped holes in the nose of the spindle 3, thus locking the upper member 33 of the mechanism onto the spindle 3 as best seen in FIG. 11.

The inside of one of the upper tenons or studs 4 is milled from underneath to provide for engagement with an upper part of a locking member 10.

Opposite the locking member 10 a groove 11 formed in the upper member 33, and subtending an angle of about 90° is partially concentric with the hole 5, so as to limit the travel of a tool support in the form of cam follower means, such as a ring 12 by means of rotation limiting means, such as a guide pin 13 fitted on the annular support 12. The lower part of the upper member 33 of the mechanism is formed with an outer thread 14, onto which can be screwed a nut in the form of a a second, or lower member 32.

The lower member 32 is formed with an interior thread 15 forming the nut. At the base of the thread 15 is provided an inner groove 16 in which is nestled holding means, such as a a circlips 17, which holds the annular support 12 in position, when the tool 30 is being removed. The annular support 12 normally rests on a circular flange 18 formed at the base of the lower member 32.

Figure 5:
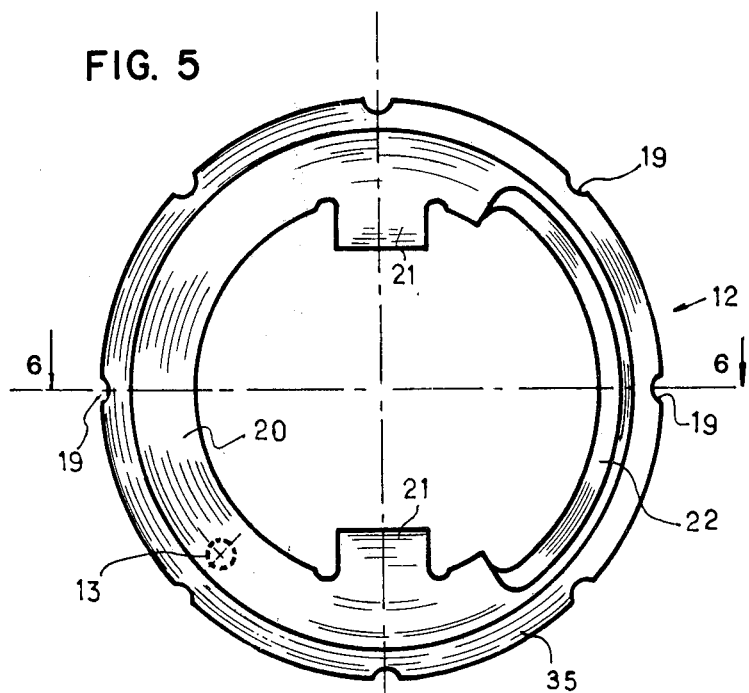
FIG. 5 shows an underside plan view of the tool support with its locking stud.
Figure 6:
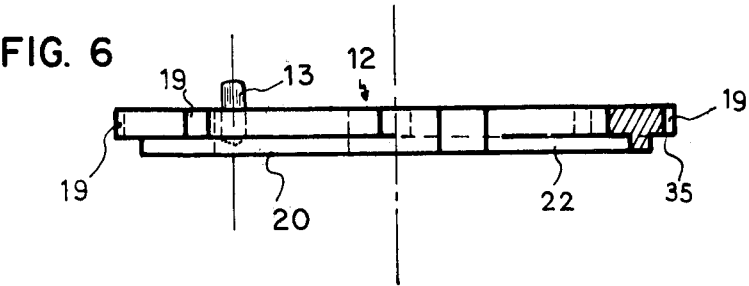
FIG. 6 is a part-sectional view of the tool support taken along line C—C of FIG. 5.
Figure 7:
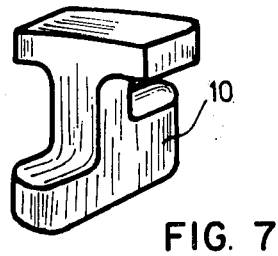
FIG. 7 is a drawing in perspective of the locking member, which effects the release of the milling spindle cone mounted on the spindle of the milling machine.
Figures 8, 8A:
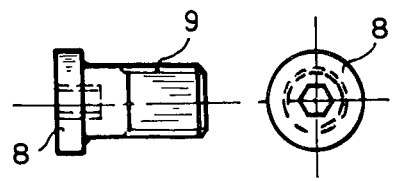
FIGS. 8 and 8a show a side view, and an elevational view, respectively, of the screw which locks the upper member of the mechanism onto the spindle of the milling machine.
Figure 9:
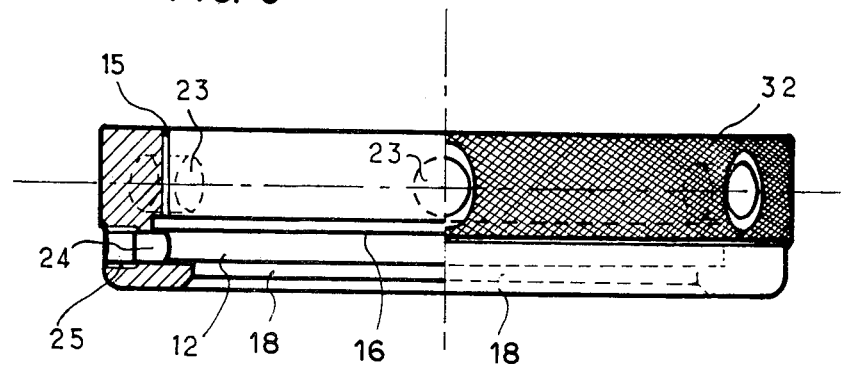
FIG. 9 shows a part-sectional view of the lower member taken along the line D—D of FIG. 10.

As shown more particularly in FIGS. 5 and 6, the circular support 12 is provided with eight notches 19 on its outer rim, which serve as engagement members for frictional drive by the lower member 32 of the mechanism.

An interior surface portion 20 of the support 12 is fitted with engaging means, such as two bosses or shoulders 21 which lock the tool onto the spindle 3; additionally, segmental groove 22 is used for positioning the automatic locking member 10, which segmental groove 22 also serves to retain the locking member 10 in position. Approximately opposite the segmental groove 22, the guide pin 13, disposed on the upper surface portion 20 of the support 12 (see FIG. 6) limits the travel of the guide pin 13 to about 90°. A protruding part of the guide pin 13 engages the groove 11 of the upper member 33 (see FIG. 2) which forms part of the rotation limiting means.

On its outside, the lower member 32 is formed with six threaded holes 23 equidistant from each other, respectively, which make it possible to lock the lower member 32 by means of a spanner or wrench tightening non-illustrated screws to the tool 30.

Figure 1:
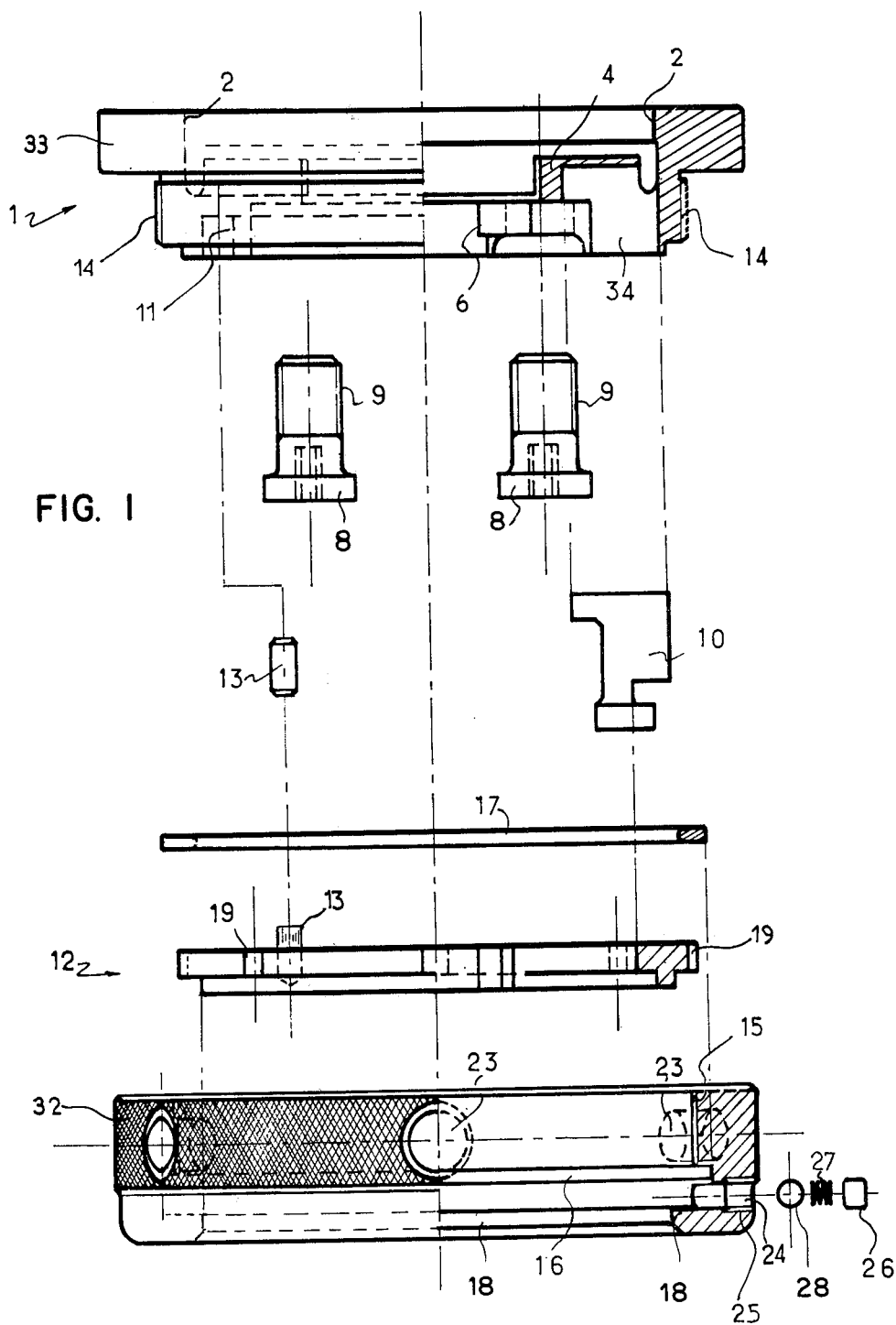
FIG. 1 shows a part-sectional view of all the members which make up the mechanism of the present invention, in their order of assembly; namely, from top to bottom, an upper member, two identical screws, an ejector, alternatively also referred to as a locking member, on the right, a support guide on the left of the Figure, a circlips, a mobile tool support, and finally a nut making up a lower member, including a ball provided with a spring and a small screw.
Figure 10:
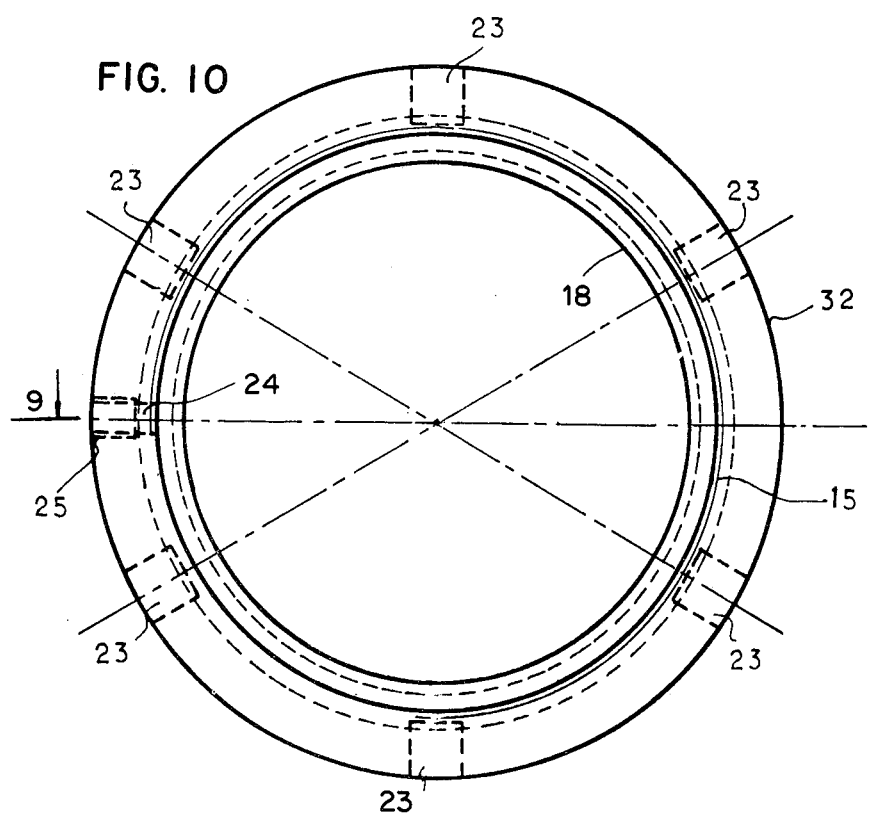
FIG. 10 is a plan view of the upper part of the lower member of the mechanism, forming the nut.

The lower member 32 is also formed with an opening 24, normally disposed between two adjacent holes 23, which communicates with its outer side, on a level with the support 12 (see FIGS. 1 and 10). The first part of the opening 24 is tapped interiorly with a thread 25 to receive cam means such as a screw 26, which by means of a spring 27, holding a ball 28 against the support 12.

In a preferred embodiment of the invention the guide 13 may be replaced by two tenons integral with the support 12, and engaging two diametrically opposite grooves in the upper member 33 of the mechanism.

In another embodiment of the invention the hole 24 may be bored from the inside of the lower member 32, thus dispensing with the screw 26.

In another embodiment of the invention the annular tool support 12 may be held in its housing by a system other than a circlips 17.

When the milling spindle of the milling tool 30 is being mounted on the spindle 3, its cone 29 is centered in relation to the spindle 3, the tenons or studs 4 of the upper member 33 are screwed onto the spindle nose by means of the screws 8, and the lower member 32 is screwed on by means of a thread 15 thereof to the thread 14 of the upper member 33; then the tool 30 is locked with the aid of a wrench introduced into one of the holes 23 so as to tighten non-illustrated screws through the threaded holes 23 to the tool 30; the locking of the tool 30 in the mechanism described in the present application is effected by screwing the lower member 32 onto the upper member 33, which causes the annular support 12 to turn by about 90°, thus automatically setting the tenons or embossed portions 6 in a direction perpendicular to the shoulders 21 of the annular support 12, whatever the variations in the thickness of the tool flanges.

When the tool is in position, screwing the lower member 32 onto the upper member 33 drives the annular support 12 by means of friction caused by a ball 28 which is made to engage a notch 19 by a spring 27. But the travel of the annular support 12 is limited to about 90° in relation to the upper member 33, because its guide pin 13 travels in a groove 11 in the upper member 33.

When the lower member 32 is screwed onto the upper member 33, the groove 11 of the upper member 33, whose dimensions permit only a movement of 90° of the guide pin 13 therein, the groove 11 being disposed symmetrically with respect to the embossed portions 6, this causes the guide pin 13 to be in its respective end position displaced always by 45° from the nearest boss 21 of the support 12. Any rotation of the lower member 32 through a variable angle affecting the vertical displacement of the support 12, whose bosses are supported on the base of the collar 31, as shown in FIG. 11, permits a take up of any tolerances existing on the shoulders of the nominally standard cone or tool 29. In order to permit the adaptor or tool to be removed from the shaft 3, the guide pin 13, when displaced by an angle of 45° from the axis subtended by the bosses 21, upon rotation of the support 12, abuts an end portion of the groove 11, thus automatically aligning the embossed portions 6 and the bosses 21.

To remove the tool 30, the lower member 32 is unscrewed, for example, with the aid of a wrench, from the upper member 33; through the pressure of the ball 28, the unscrewing motion causes the annular support 12 to turn by an angle of about 90°, this angle being limited by the guide pin 13, thus bringing about the alignment of the shoulders 21 of the support 12 with the tenons or embossed portions 6.

As is well shown in FIG. 11, the lower part of the ejector or locking member 10 is engaged by the annular support 12; the annular support 12, being held in position by the circlip 17, pulls the ejector or locking member 10 downwards. The ejector member 10 is constructed in a robust manner; its height is more than twice the height or depth of the annular support 12, as can best be seen from FIG. 11, and its lips 41 and 42 surround a flange 40 of the annular support 12, so that the flange 40 can securely slide between the lips 41 and 42 of the ejector member 10 within an angular distance of about 120°, as can be best seen from FIG. 5. In this movement, the projecting upper part of the locking member 10 presses onto a flange 31 of the tool, thus automatically releasing the cone 29 and freeing it from the spindle 3 of the machine.

Particularly interesting applications of the mechanism are for milling of pieces that necessitate frequent changes of the tool, and also in machines with a stay rod which is difficult to reach.

It will be further apparent that numerous variations and modifications may be made in the apparatus of the present invention, by any one skilled in the art, in accordance with the principles of the invention hereinabove set forth, and without the exercise of any inventive ingenuity.

We claim:

1. An adaptor for securing a conically-shaped tool to a spindle having a face portion, and being formed with a conical opening substantially matching said conically-shaped tool, comprising in combination:

a first member securable to said spindle, having a ring portion, two tenons integral with said ring portion, and two inwardly facing embossed portions integral with said ring portion, said two tenons being disposed diametrically opposite one another, and being adapted to operatively abut said face portion of said spindle, said embossed portions being displaced at an angle of about 45° with respect to said two tenons, respectively, each embossed portion being formed with a hole, said spindle having threaded openings therein, said embossed portions being adapted to be operatively alignable with said spindle for screws to be passed through said holes to mate with said threaded openings, respectively, so as to secure said first member to said spindle, a second member arranged to be threaded onto said first member, said first and second members having through-going bores, respectively, for receiving the tool, said second member including cam means, cam follower means receivable by said second member, and including two shoulders disposed diametrically opposite one another, and arranged to be juxtaposed with said embossed portions in said locked position, so as to maintain said tool frictionally locked to said spindle, and being formed with a segmental groove extending over an angle of about 90°, holding means in contact with said cam follower means, and with said second member, an ejector member adapted to be in contact with said tool, said ejector member and said holding means being positionable between an unlocked position, wherein said tool is releasable from said spindle, and a locked position, wherein said tool is frictionally locked to said spindle by rotation of said second member, at least a portion of said ejector member being slidable in said segmental groove, rotation limiting means cooperating with said cam follower means and said first member for limiting rotation of said cam follower means to a predetermined angle, and engaging means disposed on said cam follower means adapted to engage said tool to, and disengaging it from, said engaging means within first and second relative position ranges of said engaging means with respect to said tool, respectively, whereby rotation of said second member in a direction so as to thread said second member onto said first member within said second position range causes said cam follower means to follow rotation of said second member until it reaches said predetermined angle, and rotation of said second member beyond said predetermined angle in said one direction within said second position range causes said second member to wedge said tool into the opening of the spindle, while rotation of said second member in a direction so as to unthread said second member from said first member within said first position range causes said cam follower means driven by said cam means to urge said ejector member to travel in a direction so as to release said tool from said spindle.

2. An adaptor as claimed in claim 1, wherein said first member includes two inwardly facing embossed portions integral with said ring portion, and displaced at an angle of about 45° with respect to said two tenons, respectively, each being formed with a hole, said spindle having threaded openings therein, said embossed portions being adapted to be operatively alignable with said spindle for screws to be passed through said holes to mate with said threaded openings, respectively, so as to secure said first member to said spindle.

3. An adaptor as claimed in claim 2, wherein said cam follower means includes two shoulders disposed diametrically opposite one another, and arranged to be juxtaposed with said embossed portions and in said locked position, so as to maintain said tool frictionally locked to said spindle, and being formed with a segmental groove extending over an angle of about 90°, at least a portion of said ejector member being slidable in said segmental groove.

4. An adaptor as claimed in claim 1, wherein said cam follower means has a predetermined height, and wherein said ejector member has a prearranged height exceeding said predetermined height by a factor of at least two, and wherein said holding means is substantially disposed in a first plane, and said ejector member subtends an angle about a center axis of said holding means less than about 25° in a plane parallel to said first plane.

5. An adaptor as claimed in claim 4, wherein said first member is formed with a recess on a side facing said second member for receiving at least a part of said ejector member, said recess being located so as to coincide at least in part with the location of one of said tenons as seen in a projection along a direction perpendicular to said first plane, and angularly displaced by about 45° from one of said embossed portions.

6. An adaptor as claimed in claim 1, wherein said first member includes a ring portion of a predetermined diameter and is formed with a flange integral with said ring portion and facing away from said second member, said flange having a prearranged diameter exceeding said predetermined diameter.

7. An adaptor as claimed in claim 1, wherein said rotation limiting means includes a guide pin, a part of said guide pin being insertable in said cam follower means, and wherein said cam follower means is substantially disposed in a first plane, an arcuate groove being formed in said first member, and extending over about 90° therein on a side thereof facing said second member for the other part of said guide pin to be slidable in said arcuate groove, said guide pin being positionable so that its position substantially coincides with the location of said ejector member in said locked position as seen in a projection thereof along a direction perpendicularly to said first plane.

8. An adaptor as claimed in claim 1, wherein said cam means includes inwardly projecting resilient means, and said cam follower means has on its circumference a plurality of substantially equispaced notches, at least one of said notches being engageable by said resilient means, and wherein said second member has at least one radially through-going threaded opening, and said resilient means are disposed in said through-going opening and comprise a screw mating with said threaded through-going opening, a spring radially abutting said screw, and a ball abutting said spring, said ball being engageable with said one of said notches.

9. An adaptor as claimed in claim 1, wherein said second member has a plurality of holes on the periphery thereof and is adapted to receive a spanner wrench for selectively tightening and loosening said second member to, and from, said first member, respectively.

10. An adaptor adapted for securing a tool to a spindle, comprising in combination:
a first member adapted to be secured to said spindle,
a second member threadable to said first member, said first and second members having through-going bores, respectively, for receiving the tool, said second member including cam means,
cam follower means receivable by said second member, and including an annular element formed with an inwardly pointing flange extending around the inner periphery of said cam follower means over an angle of about 120°,
holding means in contact with said cam follower means and said second member, and
an ejector member formed with a pair of lips slidingly surrounding said flange and adapted to be in contact with said tool, said ejector member and said holding means being movable by said second member between a locked position, wherein said tool is frictionally locked to said spindle, and an unlocked position, wherein said tool is releasable from said spindle by rotation of said second member, and is insertable into the adaptor.

11. An adaptor for securing a conically-shaped tool to a spindle formed with a conical opening substantially matching said conically-shaped tool, comprising in combination:
an ejector member adapted to be in contact with said tool,
a first member securable to said spindle,
a second member free from any position-marking element cooperating with said ejector member, and arranged to be threaded onto said first member, said first and second members having through-going bores, respectively, for receiving the tool, said second member including cam means,
cam follower means receivable by said second member,
holding means in contact with said cam follower means, and with said second member,
said ejector member and said holding means being positionable between an unlocked position, wherein said tool is releasable from said spindle, and a locked position, wherein said tool is frictionally locked to said spindle by rotation of said second member,
rotation limiting means cooperating with said cam follower means and said first member for limiting rotation of said cam follower means to a predetermined angle, and
engaging means disposed on said cam follower means adapted to engage said tool to, and disengaging it from, said engaging means within first and second relative position ranges of said engaging means with respect to said tool, respectively, whereby rotation of said second member in a direction so as to thread said second member onto said first member within said second position range causes said cam follower means to follow rotation of said second member until it reaches said predetermined angle, and rotation of said second member beyond said predetermined angle in said one direction within said second position range causes said second member to wedge said tool into the opening of the spindle, while rotation of said second member in a direction so as to unthread said second member from said first member within said first position range causes said cam follower means driven by said cam means to urge said ejector member to travel in a direction so as to release said tool from said spindle.

12. An adaptor as claimed in claim 10, wherein said spindle has a face portion, and said first member has a ring portion and two tenons integral with said ring portion, said two tenons being disposed diametrically opposite one another and being adapted to operatively abut said face portion of said spindle.

* * * * *